(12) United States Patent
Mausen

(10) Patent No.: US 9,016,298 B2
(45) Date of Patent: Apr. 28, 2015

(54) HUNTING BLIND

(71) Applicant: Robert Mausen, Naples, FL (US)

(72) Inventor: Robert Mausen, Naples, FL (US)

(*) Notice: Subject to any disclaimer, the term of this patent is extended or adjusted under 35 U.S.C. 154(b) by 0 days.

(21) Appl. No.: 13/796,294

(22) Filed: Mar. 12, 2013

(65) Prior Publication Data
US 2014/0261595 A1  Sep. 18, 2014

(51) Int. Cl.
E04H 15/28 (2006.01)
A01M 31/02 (2006.01)

(52) U.S. Cl.
CPC ........... *A01M 31/025* (2013.01); *Y10S 135/901* (2013.01)

(58) Field of Classification Search
USPC ............... 135/16, 20.1, 901, 98, 117; 43/1–3; 42/94; D3/5–6; 89/36.01, 36.03, 36.07
See application file for complete search history.

(56) References Cited

U.S. PATENT DOCUMENTS

| | | | | |
|---|---|---|---|---|
| 285,530 | A * | 9/1883 | Verbeck | 135/66 |
| 295,013 | A * | 3/1884 | Hunter | 89/36.06 |
| 879,052 | A * | 2/1908 | Jeranek | 89/40.06 |
| 2,910,078 | A * | 10/1959 | Schunck | 135/27 |
| 4,332,266 | A * | 6/1982 | Wageley | 135/143 |
| 4,528,998 | A * | 7/1985 | Gamm | 135/75 |
| 4,836,232 | A * | 6/1989 | De Rosa et al. | 135/99 |
| 5,214,872 | A * | 6/1993 | Buyalos, Jr. | 43/1 |
| 5,385,165 | A | 1/1995 | Hazinski et al. | |
| 5,808,227 | A * | 9/1998 | Amos | 89/36.01 |
| 5,944,041 | A | 8/1999 | Kitchens | |
| 6,296,005 | B1 * | 10/2001 | Williams et al. | 135/98 |
| 6,401,736 | B1 * | 6/2002 | Jerry | 135/25.1 |
| 6,543,175 | B1 | 4/2003 | Tucker | |
| 6,705,334 | B2 * | 3/2004 | Altobelli | 135/16 |
| 6,779,537 | B1 | 8/2004 | Miller | |
| 7,344,320 | B2 * | 3/2008 | Barker et al. | 396/419 |
| 7,828,003 | B2 | 11/2010 | Montecucco | |
| 8,051,864 | B1 | 11/2011 | Gabrielson et al. | |
| 2006/0076043 | A1 | 4/2006 | Talley et al. | |
| 2007/0034342 | A1 * | 2/2007 | Fill | 160/351 |
| 2007/0089771 | A1 * | 4/2007 | Jerry | 135/98 |
| 2008/0196754 | A1 * | 8/2008 | Saiz | 135/98 |
| 2009/0205692 | A1 * | 8/2009 | Sapp | 135/16 |
| 2010/0116442 | A1 | 5/2010 | Pottmeyer et al. | |

OTHER PUBLICATIONS

"Cabela's: M.A.D. Max Blind", http://www.cabelas.com/product/MAD-Max-Blind/1581143.uts?Ntk=AllProducts&s . . . , printed Feb. 18, 2013.

\* cited by examiner

*Primary Examiner* — Winnie Yip
(74) *Attorney, Agent, or Firm* — Hahn, Loeser & Parks, LLP; Rex W. Miller, II

(57) ABSTRACT

A hunting blind is presently disclosed that includes a central support comprising a main body and an extendable portion, the extendable portion configured to maintain the hunting blind in an upright position, a gun rest secured to the main body of the central support opposite the extendable portion, a plurality of ribs pivotally secured to the main body of the central support, the ribs configured to rotate between an open configuration and a closed configuration, and a screen comprising a plurality of opaque screen sections, each screen section secured to at least one rib and at least one other rib or the main body of the central support, each screen section comprising a flexible material such that the screen sections are collapsible, wherein when the ribs are in the open configuration, the screen is configured to obscure a hunter from a target.

19 Claims, 4 Drawing Sheets

HUNTING BLIND

BACKGROUND

The present disclosure relates to hunting blinds, and more particularly, portable hunting blinds that may be rapidly deployed to obscure a hunter from a target.

A variety of hunting blinds have been used in the past including both stationary and portable blinds. Stationary blinds are typically constructed and left in a given location for an extended period. A hunter using a stationary blind remains at the location of the blind and waits for game to enter the field of view available from the blind.

For hunting some game, such as wild turkey, it may be inefficient for a hunter to occupy a single location and simply wait for the game to appear. Instead of waiting for the game to move to the hunter, the hunter may move to the game. For example, when hunting turkey or other wild birds, a hunter will often walk through a field, woods or other terrain until the hunter spots the turkey. At that point the hunter would prefer to obscure himself from the turkey to avoid startling the game and causing it to flee. For these situations, portable hunting blinds have been developed that may be carried by the hunter and then deployed once the hunter has spotted the targeted game. The portable hunting blinds previously available however have tended to be difficult to setup without raising the attention of the target game and/or have provided insufficient cover for the hunter. In view of these limitations, there remains a need in the industry for portable hunting blinds that are easily carried over typically hunting terrain, quickly deployable without alarming the target game, and that provide sufficient cover to obscure the hunter.

SUMMARY

Presently disclosed is a hunting blind that includes a central support comprising a main body and an extendable portion, the extendable portion configured to maintain the hunting blind in an upright position, a gun rest secured to the main body of the central support opposite the extendable portion, a plurality of ribs pivotally secured to the main body of the central support, the ribs configured to rotate between an open configuration and a closed configuration, and a screen comprising a plurality of opaque screen sections, each screen section secured to at least one rib and at least one other rib or the main body of the central support, each screen section comprising a flexible material such that the screen sections are collapsible, wherein when the ribs are in the open configuration, the screen is configured to obscure a hunter from a target.

In embodiments, each screen section includes a mesh fabric. The extendable portion may be a stake, and may be moveable between an extended position and a retracted position. The central support may include at least one releasable latch configured to secure the extendable portion in an extended position. Alternatively, the central support may include a friction lock configured to secure the extendable portion in an extended position or retracted position. The hunting blind may also include a retaining strap secured to the central support and configured to maintain the plurality of ribs and the plurality of screen sections in the closed configuration. In one embodiment, the screen may have a diameter of at least 48 inches in the open configuration.

In another embodiment, a hunting blind is disclosed that includes a central support extending between a first end and second end, the first end of the central support comprising a releasable attachment for securing the hunting blind to a structure, a plurality of ribs pivotally secured to the central support, the ribs configured to rotate between an open configuration and a closed configuration, and a screen comprising a plurality of opaque screen sections, each screen section secured to at least one rib and at least one other rib or the central support, each screen section comprising a flexible material such that the screen sections are collapsible, wherein when the ribs are in the open configuration, the screen is configured to obscure a hunter from a target.

In embodiments, the hunting blind may also include a gun rest secured to the second end of central support. In embodiments, the releasable attachment may be a clamp, hook or other device for securing the hunting blind to a structure. The central support may include a main body and an extendable portion, wherein the extendable portion defines the first end of the main body with the releasable attachment for securing the hunting blind to a structure. The extendable portion may be moveable between an extended position and a retracted position.

BRIEF DESCRIPTION OF THE DRAWINGS

Reference is made to the accompanying drawings in which particular embodiments of the invention are illustrated as described in more detail in the description below, in which.

DETAILED DESCRIPTION OF THE DRAWINGS

Figure 1:
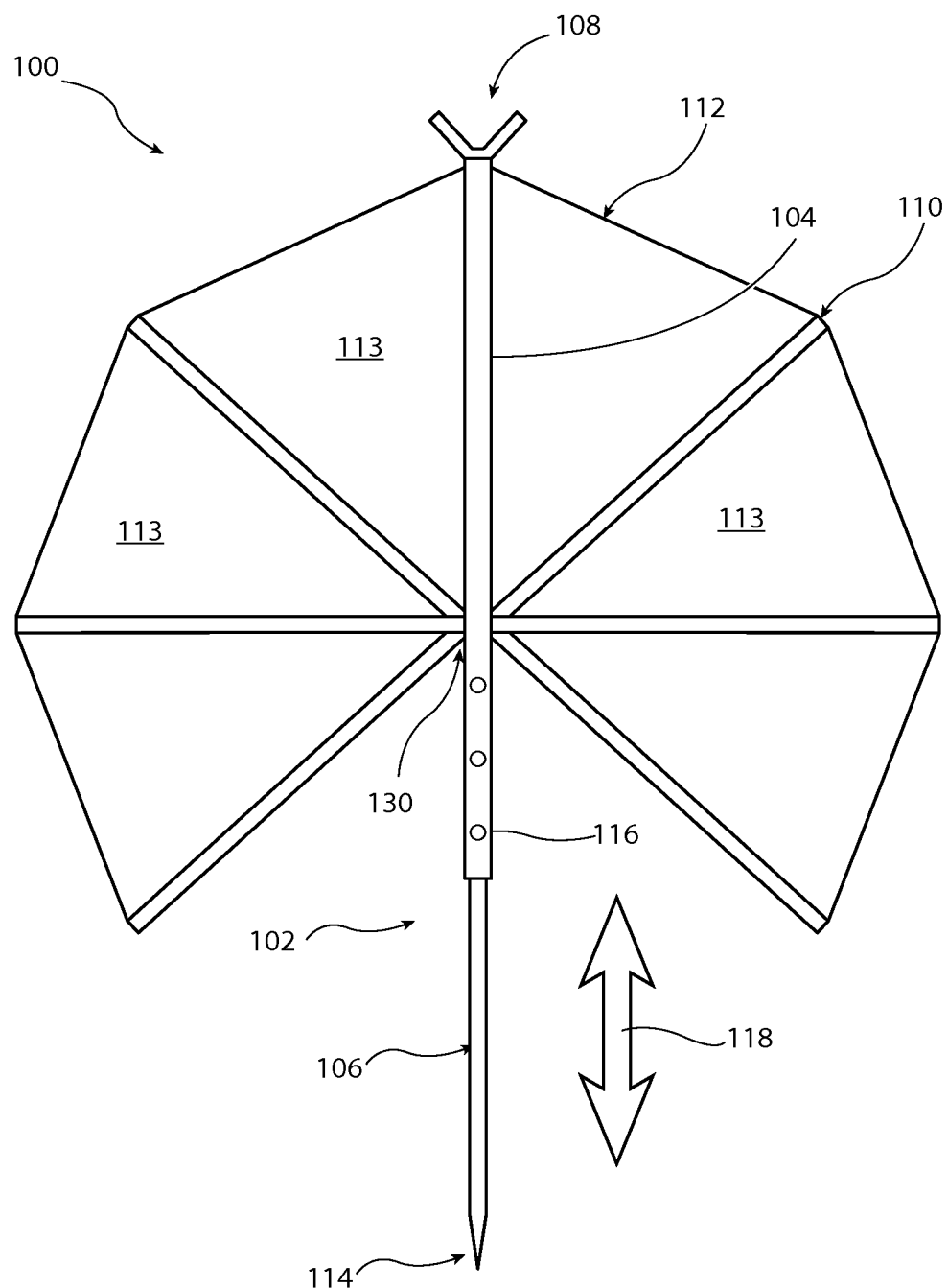
FIG. 1 is a perspective view of a hunting blind in an open configuration.

Referring generally to FIGS. 1-4, embodiments of a hunting blind are disclosed. The hunting blind 100 includes a central support 102, a gun rest 108, a plurality of ribs 110, and a screen 112. Referring to FIG. 1, the hunting blind is illustrated in an open configuration. The hunting blind includes a central support 102 comprising a main body 104 and a extendable portion 106. The extendable portion 106 is configured to maintain the hunting blind in an upright position. In one embodiment, the extendable portion is a stake 114. A stake refers to a structure with a pointed or tapered end configured to be inserted into the ground to secure the hunting blind in an upright position. The stake allows the hunter to insert the hunting blind in the ground in an upright position. Although described for use in connection with hunting, the hunting blind presently disclosed is not limited to hunting applications and may be used simply to obscure a user, such as for observing wild animals with minimal disruption to their natural environment.

In another embodiment, the extendable portion 106 may be moveable between an extended position, as shown in FIG. 1, and a retracted position. The retracted position reduces the overall size of the hunting blind and may facilitate transporting or carrying the hunting blind. In one embodiment, the central support of the hunting blind further comprises at least one releasable latch 116 configured to secure the extendable portion in an extended position. Further, the extendable portion may be moved up and down the central support (as shown by arrow 118). The releasable latch 116 provides for the extendable portion to be extended at different lengths allowing the hunter to customize the height of the hunting blind as needed according to the hunter's position. For example, the hunting blind height can be adjusted to accommodate a hunter lying on the ground or sitting up, or adjusted to accommodate differences in terrain. Additionally, the releasable latch stops the extendable portion from sliding down when the extendable portion is not being deliberately moved.

Figure 2:
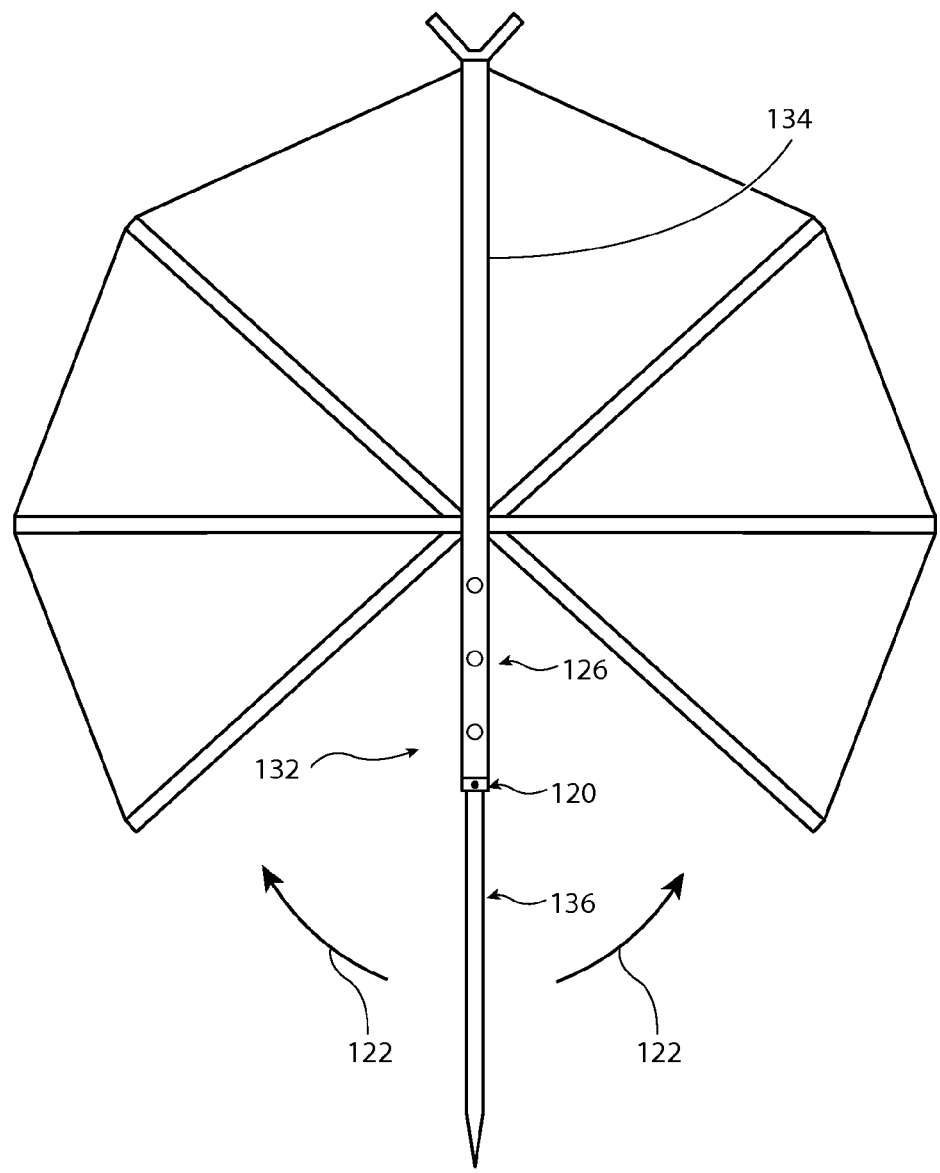
FIG. 2 is a perspective view of another embodiment of a hunting blind.

In an alternative embodiment, as illustrated in FIG. 2, the hunting blind may include a the central support 132 that has a main body 134, an extendable portion 136 and a pivot joint 120 located between the main body and the extendable portion. The pivot joint 120 allows for the extendable portion to be rotated (as shown by arrows 122) in either direction and be placed on top of the main body in a retracted position. The pivot joint 120 can also be used to angle the hunting blind as desired. The central support may further comprise at least one releasable latch 126 configured to secured the extendable portion in a retractable position. In yet another embodiment, the extendable portion may be both moved up and down the central support and rotated right and left by the pivot joint.

Referring back to FIG. 1, the hunting blind 100 includes a gun rest 108. The gun rest is secured to the main body 104 of the central support 102 opposite to the extendable portion 106. The gun rest 108 enables a hunter to rest the gun in a ready position while hiding behind the hunting blind. The gun rest provides further stability for the gun while the hunter is aiming at a target. In one embodiment, the hunting blind is configured to support interchangeable gun rests enabling the hunting blind to be customized by the user. In another embodiment, the hunting blind may be configured to support removable gun rests enabling the hunting blind to be stored and carried with ease.

Figure 3:
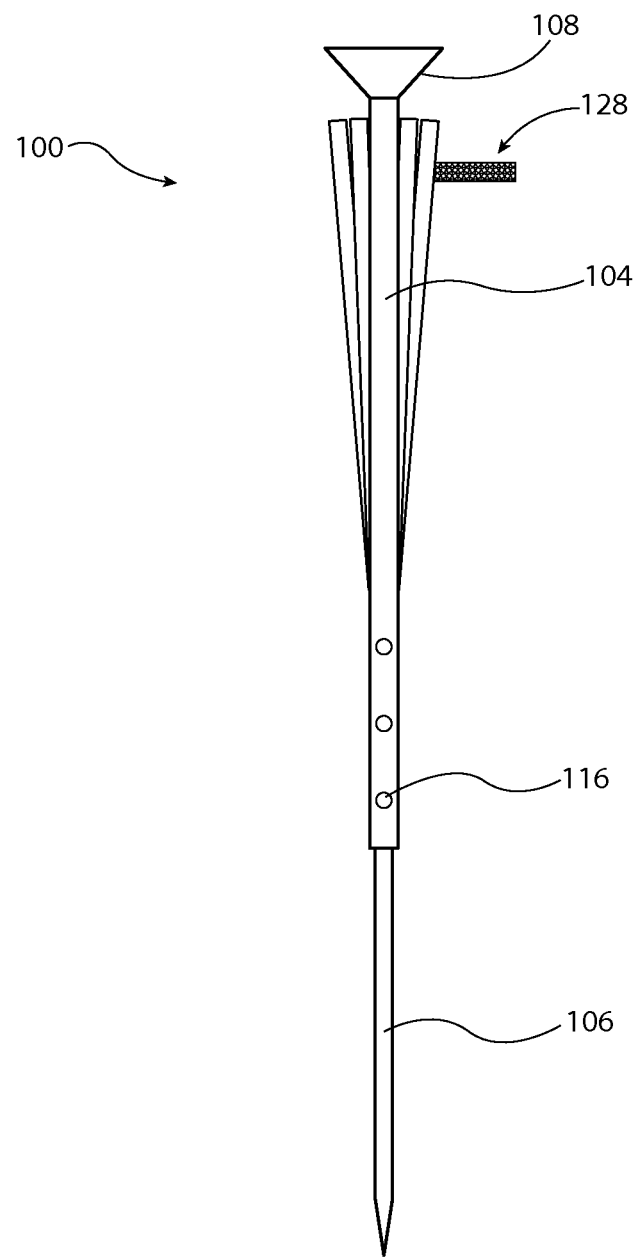
FIG. 3 is a perspective view of the hunting blind of FIG. 1 in a closed configuration.

As further illustrated by FIG. 1, the hunting blind includes a plurality of ribs 110 pivotally secured to the main body 104 of the central support by a rib pivot 130. The ribs 110 are configured to rotate between an open configuration (as shown in FIG. 1) and a closed configuration (as shown in FIG. 3). The ribs may be configured to be fully opened, partially opened, or completely closed to provide coverage as needed. The hunting blind further includes a screen 112. The screen 112 comprises a plurality of opaque screen sections 113, each screen section secured to at least one rib and at least one other rib or to the main body. For example, a screen section may be secured to two ribs. In another example, a screen section may be secured to a rib 110 and the main body 104. Each screen section comprises a flexible material. The flexible material provides for the screen sections to be collapsible allowing the ribs to be configured in fully opened, partially opened, or closed configuration. The flexible material allows for the hunting blind to be quickly set and ready for use. When the ribs are in the open configuration, the screen is configured to obscure a hunter from a target. The screen may have a diameter of at least 48 inches in the open configuration. In embodiments, each screen may be made of various fabrics that can withstand water, dry quickly, and fold easily, and is otherwise suitable for outdoor use. In one embodiment, the screen is a mesh material. In another embodiment, the screen may be constructed of nylon with an acrylic coating.

Referring to FIG. 3, a hunting blind is illustrated in the closed configuration. The hunting blind 100 may further comprise a retaining strap 128 secured to the central support. The retaining strap is configured to maintain the plurality of ribs and the plurality of screen sections in the closed configuration allowing the hunting blind to be easily carried or stored. In another embodiment, the retaining strap may be secured to a rib. In embodiments, the retaining strap includes Velcro® or other fastening features to maintain the hunting blind in the closed configuration.

Figure 4:
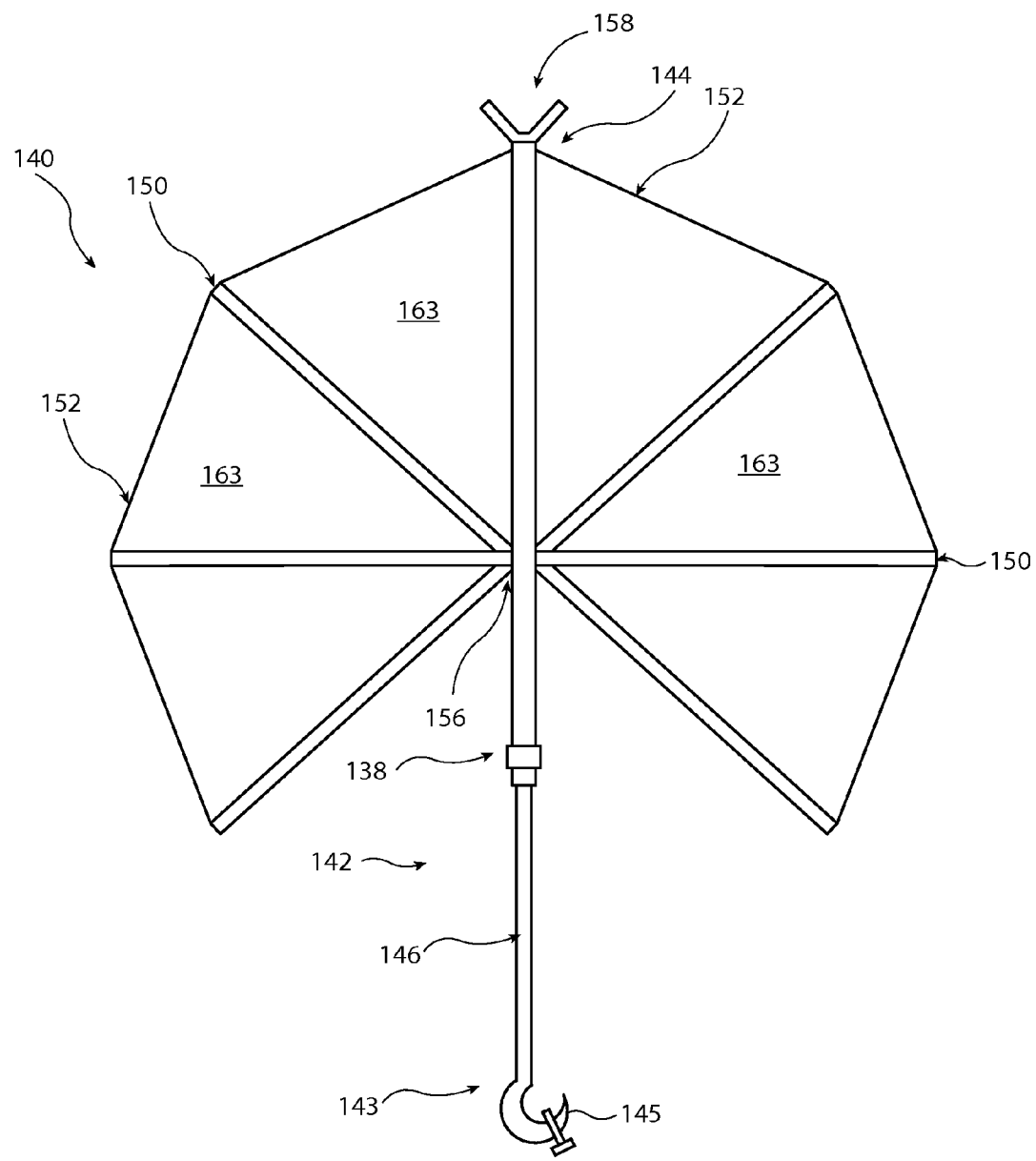
FIG. 4 is a perspective view of another embodiment of a hunting blind.

As shown in FIG. 4, in one embodiment, the central support may further comprise a friction lock 138 configured to secure the extendable portion in an extended position or retracted position. The friction lock allows for the extendable portion to be moved up and down the central support. Additionally, the friction lock prevents the extendable portion from sliding around the central portion when the extendable portion is not being deliberately moved. Further, the friction lock provides for the extendable portion to be extended at different lengths allowing the hunter to customized the height of the hunting blind as needed.

In an alternative embodiment of the present invention, as illustrated in FIG. 4, the hunting blind 140 may comprise a central support 142, a plurality of ribs 150, and a screen 152. The central support 142 extends between a first end 143 and a second end 144. The first end of the central support comprises a releasable attachment 146 for securing the hunting blind to a structure. In one embodiment, the releasable attachment 146 may comprise a clamp 145. A clamp refers to a device with opposing, often adjustable sides or parts for bracing objects or holding them together. The clamp may be used to attach the hunting blind to another structure besides the ground. In another embodiment, the releasable attachment may comprise a spring clamp. The spring clamp provides for opening and closing and easy application and removal. In yet another embodiment, the releasable attachment may comprise a hook or other securing element appropriate to the secure the hunting blind to a selected structure in a desired orientation.

The hunting blind includes a plurality of ribs 150 pivotally 156 secured to the central support 142. As previously discussed, the ribs are configured to rotate between an open configuration and a closed configuration. The hunting blind also includes a screen 152 comprising a plurality of opaque screen sections 163, each screen section secured to at least one rib and at least one other rib or the central support. Each screen section comprises a flexible material such that the screen sections are collapsible, wherein when the ribs are in the open configuration, the screen is configured to obscure a hunter from a target.

The hunting blind may further comprise a gun rest 158 secured to the second end of the central support. In an embodiment, the central support may comprise a main body and an extendable portion, wherein the extendable portion defines the first end of the main body with the releasable attachment for securing the hunting blind to a structure. The extendable portion may be moveable between an extended position and a retracted position.

While certain embodiments have been described, it must be understood that various changes may be made and equivalents may be substituted without departing from the spirit or scope. In addition, many modifications may be made to adapt a particular situation or material to the teachings of the disclosure without departing from its spirit or scope.

What is claimed:

1. A hunting blind comprising:
    a central support comprising a main body and an extendable portion, the extendable portion configured to maintain the hunting blind in an upright position,
    a gun rest secured to an upper end of the main body of the central support opposite the extendable portion,
    a plurality of ribs pivotally secured to the main body of the central support by at least one pivot, the ribs configured to rotate between an open configuration and a closed configuration, and
    a screen comprising a plurality of opaque screen sections, each screen section secured to at least one rib and at least one other rib or the main body of the central support, each screen section comprising a flexible material such that the screen sections are collapsible, wherein when the ribs are in the open configuration, the screen is configured to obscure a hunter from a target, and when the ribs are in the closed configuration, each rib extends from the at least one pivot toward the gun rest.

2. The hunting blind of claim 1, wherein each screen section comprises a mesh fabric.

3. The hunting blind of claim 1, where the extendable portion comprises a stake.

4. The hunting blind of claim 1, wherein the extendable portion is moveable between an extended position and a retracted position.

5. The hunting blind of claim 1, wherein the central support further comprises at least one releasable latch configured to secure the extendable portion in an extended position.

6. The hunting blind of claim 1, wherein the central support further comprises a friction lock configured to secure the extendable portion in an extended position or retracted position.

7. The hunting blind of claim 1 further comprising a retaining strap secured to the central support and configured to maintain the plurality of ribs and the plurality of screen sections in the closed configuration.

8. The hunting blind of claim 1, wherein the screen has a diameter of at least 48 inches in the open configuration.

9. The hunting blind of claim 1, wherein each of the plurality of ribs has an axis of rotation defined by the at least one pivot, and wherein the axis of rotation for each rib is substantially parallel to the axis of rotation for each of the other ribs.

10. The hunting blind of claim 1, wherein the plurality of ribs are pivotally secured to the main body of the central support by one pivot.

11. A hunting blind comprising:
a central support extending between a first end and second end, the first end of the central support comprising a releasable attachment for securing the hunting blind to a structure,
a gun rest secured to the second end of the central support,
a plurality of ribs pivotally secured to the central support by at least one pivot, the ribs configured to rotate between an open configuration and a closed configuration, and
a screen comprising a plurality of opaque screen sections, each screen section secured to at least one rib and at least one other rib or the central support, each screen section comprising a flexible material such that the screen sections are collapsible,
wherein when the ribs are in the open configuration, the screen is configured to obscure a hunter from a target, and when the ribs are in the closed configuration, each rib extends from the at least one pivot toward the second end of the central support.

12. The hunting blind of claim 11, wherein each screen section comprises a mesh fabric.

13. The hunting blind of claim 11, wherein the releasable attachment comprises a clamp.

14. The hunting blind of claim 11, wherein the central support comprises a main body and an extendable portion, and wherein the extendable portion defines the first end of the central support with the releasable attachment for securing the hunting blind to a structure.

15. The hunting blind of claim 14, wherein the extendable portion is moveable between an extended position and a retracted position.

16. The hunting blind of claim 14, wherein the central support further comprises at least one releasable latch configured to secure the extendable portion in an extended position.

17. The hunting blind of claim 14, wherein the central support further comprises a friction lock configured to secure the extendable portion in an extended position or retracted position.

18. The hunting blind of claim 11, further comprising a retaining strap secured to the central support and configured to maintain the plurality of ribs and the plurality of screen sections in the closed configuration.

19. The hunting blind of claim 11, wherein the screen has a diameter of at least 48 inches in the open configuration.

* * * * *